US008538459B2

(12) United States Patent
Choi et al.

(10) Patent No.: US 8,538,459 B2
(45) Date of Patent: Sep. 17, 2013

(54) MOBILE TERMINAL AND METHOD FOR CONFIGURING IDLE SCREEN THEREOF

(75) Inventors: Jinwook Choi, Seoul (KR); Seungwon Lee, Seoul (KR); Seungcheon Baek, Seoul (KR); Jungsu Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 235 days.

(21) Appl. No.: 13/012,695

(22) Filed: Jan. 24, 2011

(65) Prior Publication Data
US 2012/0015693 A1    Jan. 19, 2012

(30) Foreign Application Priority Data
Jul. 13, 2010   (WO) ................ PCT/KR2010/004532

(51) Int. Cl.
H04W 24/00 (2009.01)
(52) U.S. Cl.
USPC .................. 455/456.3; 455/412.1; 455/412.2; 455/414.2; 455/414.3; 455/456.1
(58) Field of Classification Search
USPC ................................. 455/566; 715/810–847
See application file for complete search history.

(56) References Cited

U.S. PATENT DOCUMENTS

| 2007/0042813 | A1* | 2/2007 | Ito .................................. 455/573 |
| 2007/0298843 | A1 | 12/2007 | Kwon |
| 2009/0083663 | A1* | 3/2009 | Kim .............................. 715/811 |
| 2009/0158168 | A1 | 6/2009 | Heo et al. |
| 2009/0309748 | A1* | 12/2009 | Elgort et al. ............... 340/686.6 |
| 2010/0131897 | A1* | 5/2010 | Yamao .......................... 715/811 |
| 2010/0295667 | A1* | 11/2010 | Kyung et al. ............... 340/407.2 |
| 2010/0304764 | A1* | 12/2010 | Sweeney et al. .............. 455/466 |
| 2011/0143705 | A1* | 6/2011 | Ogram et al. .............. 455/404.1 |
| 2012/0196626 | A1* | 8/2012 | Fano et al. .................. 455/456.3 |

FOREIGN PATENT DOCUMENTS

| KR | 10-0695258 B1 | 12/2006 |
| KR | 10-2008-0000103 A | 1/2008 |
| KR | 10-2008-0073621 A | 8/2008 |
| KR | 10-2009-0058322 a | 6/2009 |

* cited by examiner

Primary Examiner — Dai A Phuong
(74) Attorney, Agent, or Firm — Birch, Stewart, Kolasch & Birch, LLP

(57) ABSTRACT

A mobile terminal and a method for configuring a screen of the mobile terminal are discussed. According to an embodiment, the method includes collecting status information and usage information of the mobile terminal while menus displayed on the screen of the mobile terminal are used, forming a menu usage pattern based on at least one of the status information and the usage information, and selectively changing, based on at least the menu usage pattern, at least one display configuration of menus to be displayed on the screen when the screen is idle.

21 Claims, 19 Drawing Sheets

FIG. 5

| ID NUMBER | TIME | | LOCATION | | MOVEMENT | USED MENU |
|---|---|---|---|---|---|---|
| | START | END | DEPARTURE | ARRIVAL | | |
| 0010 | 07:00 | 08:00 | HOME | HOME | - | ALARM, MISSED CALL/MESSAGE, WEATHER, NEWS |
| 0020 | 08:00 | 09:00 | HOME | OFFICE | SUBWAY | CLOCK, VIDEO PLAYER, ENGLISH STUDY |
| 0030 | 09:00 | 18:00 | OFFICE | OFFICE | - | CLOCK, TO-DO LIST, STOCKS |
| 0040 | 18:00 | 19:00 | OFFICE | PARK | SUBWAY | CLOCK, VIDEO PLAYER, ENGLISH STUDY |
| 0050 | 19:00 | 20:00 | PARK | PARK | JOGGING | CLOCK, MUSIC PLAYER, SPORT TRACKER |
| 0060 | 20:00 | 20:30 | PARK | HOME | BUS | CLOCK, VIDEO PLAYER, ENGLISH STUDY |
| 0070 | 20:30 | 22:00 | HOME | HOME | - | WEATHER, NEWSPAPER, MAGAZINE |
| 0080 | 22:30 | 07:00 | HOME | HOME | - | CLOCK, RADIO, E-BOOK |

300

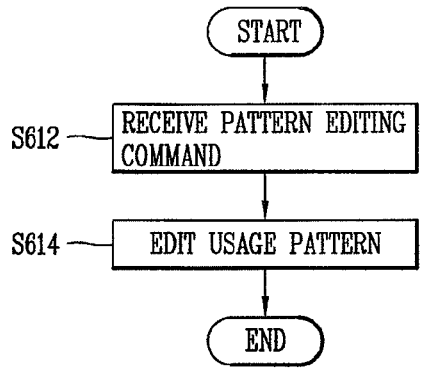
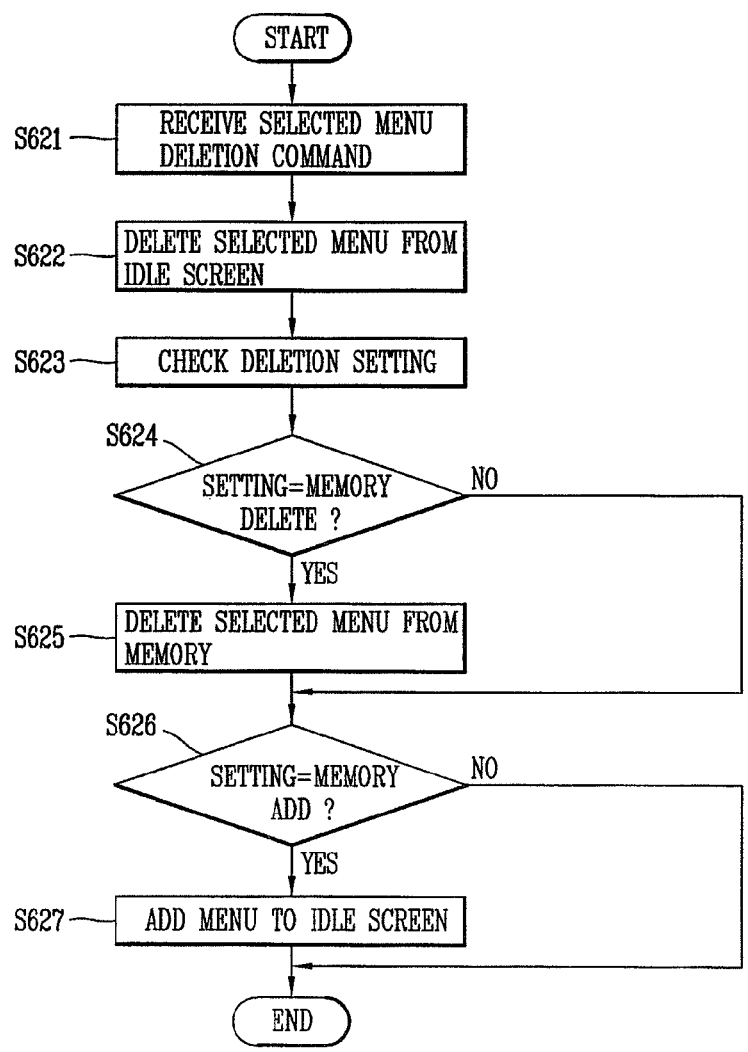

MOBILE TERMINAL AND METHOD FOR CONFIGURING IDLE SCREEN THEREOF

CROSS REFERENCE TO RELATED APPLICATIONS

Pursuant to 35 U.S.C. §119(a), this application claims the benefit of earlier filing date and right of priority to International Application No. PCT/KR2010/004532, filed on Jul. 13, 2010, the content of which is incorporated by reference herein in its entirety.

BACKGROUND OF THE INVENTION

1. Field of the Invention

The present invention relates to a mobile terminal and a method for configuring an idle screen thereof and, more particularly, to a mobile terminal for dynamically changing an idle screen and a method for configuring the idle screen of the mobile terminal.

2. Description of the Related Art

Recently, as mobile terminals provide various, complex functions, a consideration of the convenience of user interfaces (UIs) including a menu display, and the like, is needed. Further, mobile terminals which have more user-friendly UIs are desired.

SUMMARY OF THE INVENTION

Accordingly, an object of the present invention is to address the above-noted and other problems associated with the related art.

Another object of the present invention is to provide a mobile terminal capable of analyzing a user's usage pattern of a mobile terminal and configuring an optimum idle screen according to the usage pattern to thus guarantee a quick and convenient access to menus according to contexts, and to provide a method for configuring the idle screen of the mobile terminal.

According to an aspect of the invention, there is provided a method for configuring an idle screen of a mobile terminal, including: collecting status information of a mobile terminal detected when menus are in use, and usage information of the menus; forming a usage pattern based on the status information and the usage information; determining a display mode of an idle screen; when the display mode is a first mode, detecting status information of the mobile terminal and changing the configuration of menus displayed on the idle screen on the basis of the detected status information and the usage pattern, and when the display mode is a second mode, maintaining a default configuration of the menus displayed on the idle screen, wherein the status information includes at least one of information regarding time of the mobile terminal, information regarding a location of the mobile terminal, and information detected through at least one of sensors provided in the mobile terminal, and the usage information includes information regarding at least one of the number of executions of the menus and execution duration of the menus.

The method may further include: receiving a command for editing the usage pattern; and editing the usage pattern on the basis of the command. The method may further include: receiving a command for changing the display mode; and interchanging the first and second modes on the basis of the command. The method may further include: receiving a command for deleting a menu selected by a user from menus displayed on the idle screen; and deleting the selected menu from the idle screen. The method may further include: deleting the selected menu from a memory. The method may further include: changing the configuration of the menus displayed on the idle screen on the basis of the deletion results. The method may further include: receiving a request for displaying the idle screen before determining the display mode.

In collecting the status information of the mobile terminal and the usage information of the menus, the status information and the usage information may be collected during a pre-set period.

The determining of the display mode may include: receiving a command for selecting one of the first and second modes; and determining the display mode on the basis of the command. The determining of the display mode may include: measuring a remaining battery capacity; and determining the display mode of the idle screen on the basis of the remaining battery capacity. The menus may include items in relation to execution of application. The applications may include an application installed by a user a separately installed application. The application may include a widget. The usage information may further include information regarding whether to delete the menus.

The idle screen may include a first area for displaying an item in relation to execution of the widget among the menus displayed on the idle screen and a second area for displaying an item in relation to execution of an application among the menus displayed on the idle screen. The configuration of the menus may include at least one of a position, size, and order of the menus displayed on the idle screen. The default configuration of the menus may be a pre-set configuration or a configuration set by the user. The sensors may include at least one of an acceleration sensor, a gyro sensor, a geomagnetic sensor, a proximity sensor, an illumination sensor, a temperature sensor, and a humidity sensor.

According to another aspect of the invention, there is provided a mobile terminal including: a pattern controller configured to collect status information of the mobile terminal detected when menus are in use and usage information of the menus and form a usage pattern based on the status information and the usage information; and an idle screen controller configured to determine a display mode of the idle screen, detect status information of the mobile terminal when the display mode is a first mode, change the configuration of the menus displayed on the idle screen on the basis of the detected status information and the usage pattern, and maintain a default configuration of the menus displayed on the idle screen when the display mode is a second mode, wherein the status information includes at least one of information regarding time of the mobile terminal, information regarding a location of the mobile terminal, and information detected through at least one of sensors provided in the mobile terminal, and the usage information includes information regarding at least one of the number of executions of the menus and execution duration of the menus.

The pattern controller may receive a command for editing the usage pattern and edit the usage pattern on the basis of the command. The idle screen controller may receive a command for changing the display mode, and interchange the first and second modes on the basis of the command. The idle screen controller may receive a command for deleting a menu selected by a user from menus displayed on the idle screen, and delete the selected menu from the idle screen. The idle screen controller may delete the selected menu from a memory. The idle screen controller may change the configuration of the menus displayed on the idle screen on the basis of the deletion results. The idle screen controller may receive a request for displaying the idle screen. The idle screen controller may collect the status information and the usage information during a pre-set period. The idle screen controller may receive a command for selecting one of the first and second modes, and determine the display mode on the basis of the command. The idle screen controller may measure a remaining battery capacity, and determine the display mode of the idle screen on the basis of the remaining battery capacity.

The menus may include items in relation to execution of an application. The application may include an application installed by a user. The application may include a widget. The usage information may further include information regarding whether to delete the menus. The idle screen may include a first area for displaying an item in relation to execution of the widget among the menus displayed on the idle screen and a second area for displaying an item in relation to execution of an application among the menus displayed on the idle screen. The configuration of the menus may include at least one of a position, size, and order of the menus displayed on the idle screen. The default configuration of the menus may be a pre-set configuration or a configuration set by the user. The sensors may include at least one of an acceleration sensor, a gyro sensor, a geomagnetic sensor, a proximity sensor, an illumination sensor, a temperature sensor, and a humidity sensor.

According to another aspect of the invention, there is provided a method for configuring a screen of a mobile terminal, including: collecting, by the mobile terminal, status information and usage information of the mobile terminal while menus displayed on the screen of the mobile terminal are used; forming a menu usage pattern based on at least one of the status information and the usage information; and selectively changing, based on at least the menu usage pattern, at least one display configuration of menus to be displayed on the screen when the screen is idle.

According to another aspect of the invention, there is provided a mobile terminal including a display unit including a screen; and a controller configured to: collect status information and usage information of the mobile terminal while menus displayed on the screen of the mobile terminal are used, form a menu usage pattern based on at least one of the status information and the usage information, and selectively change, based on at least the menu usage pattern, at least one display configuration of menus to be displayed on the screen when the screen is idle.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 5 illustrates an example of a pattern table according to an exemplary embodiment of the present invention;

FIG. 11 is a flow chart illustrating the process of editing a pattern according to an exemplary embodiment of the present invention;

FIG. 12 is a flow chart illustrating the process of deleting a menu according to an exemplary embodiment of the present invention;

DETAILED DESCRIPTION OF THE PREFERRED EMBODIMENTS

Figure 1A:
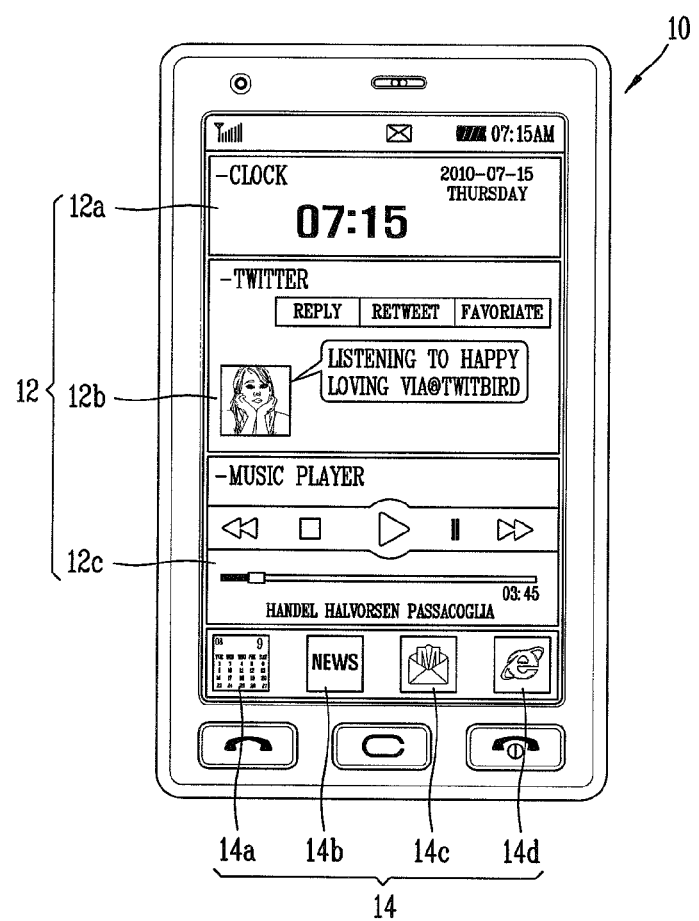
FIG. 1A and FIG. 1B are an overview of a display screen illustrating a process of changing of a menu configuration displayed on an idle screen of a mobile terminal according to an exemplary embodiment of the present invention.

The mobile terminal according to exemplary embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself.

Definition of Menu

The term 'menu' described in the present disclosure refers to an item that can be selected by a user from a screen. The menu can include a menu basically provided by a mobile terminal and a menu set by the user. The menu may include an item in relation to the execution of an application. The application may include an application installed by the user or can be an application preloaded by the manufacture of the mobile terminal. The application may include a widget.

Definition of Status Information of Mobile Terminal

The term 'status information' described in the present disclosure preferably refers to information collected through hardware such as one or more sensors and the like, provided in the mobile terminal or information collected through software such as Web-related menus and the like, when menus provided in the mobile terminal are in use. The 'status information' can also include information collected through a combination of the hardware and software. The information collected through the hardware can include information regarding time received from a repeater or calculated based on a counter, information regarding a location (e.g., place, area, etc.) recognized through a global positioning system (GPS) or other positioning system, a 3G/WiFi, network, and the like, information regarding a movement detected by a gyro sensor, and the like. The information collected through the software can include schedule information, map information, calendar information, traffic information, weather information, and the like.

According to an exemplary embodiment of the present invention, the status information can include at least one of information regarding the time of the mobile terminal, information regarding a location, an area, or a place of the mobile terminal, and information detected through at least one of the sensors provided in the mobile terminal. The sensors provided in the mobile terminal can include at least one of an acceleration sensor, a gyro sensor, a geomagnetic sensor, a proximity sensor, an illumination sensor, a temperature sensor, and a humidity sensor.

Definition of Usage Information of Menu

The term 'usage information' described in the present disclosure refers to information related to the use of menus provided in the mobile terminal. The usage information may refer to types of operations in relation to menus such as menu execution, menu deletion, and the like, whether to perform operation including execution or deletion, the number of executions, execution duration, and the like. According to an exemplary embodiment of the present invention, the usage information may include information regarding at least one of the number of executions of menus and execution duration. The execution of a menu can include at least one of selecting a menu and activating an operation corresponding to the selected menu. The execution duration preferably refers to a time of using the operation.

Definition of Usage Pattern

The term 'usage pattern' described in the present disclosure preferably refers to information regarding menus repeatedly used in a particular context. For example, the usage pattern may refer to information regarding menus frequently used at a particular time or in a particular area.

Definition of Idle Screen

The term 'idle screen' described in the present disclosure preferably refers to a basic screen image displayed when a particular operation is not executed in the mobile terminal. For instance, the mobile terminal includes a screen on which various images and contents are displayed. When the screen or terminal is not used for a predetermined time period, the terminal can be configured so that the terminal as well as the screen enters an idle mode. The screen that is in the idle mode is an idle screen, and the idle screen can display a predetermined image or no image according to the setting of the mobile terminal.

Definition of Menu Configuration

The term 'menu configuration' described in the present disclosure preferably refers to at least one of a position, size, and order of menus displayed on the idle screen. The menu configuration may be determined on the basis of menu usage information. For example, a menu configuration may be determined in the order of the number of executions of the menus or in the order of the execution duration of the menus.

Definition of Default Configuration of Menu

The term 'default configuration of menu' described in the present disclosure preferably refers to a configuration set regardless of a usage pattern. For instance, a menu configuration displayed on the idle screen is previously set or set by a user, and this configuration can be considered a default configuration of menu.

General Description of Mobile Terminal

The mobile terminal described in exemplary embodiments of the present invention may include mobile phones, smart phones, notebook computers, digital broadcast receivers, PDAs (Personal Digital Assistants), PMPs (Portable Multimedia Player), navigation devices, and the like. It would be understood by a person in the art that the configuration according to the embodiments of the present invention can be also applicable to the fixed types of terminals such as digital TVs, desktop computers, or the like, except for any elements especially configured for a mobile purpose.

Further, the present disclosure describes the operations of the mobile terminal. However, the invention is not limited thereto, and the operations and methods of the present invention can be applied to idle screens of other apparatuses.

Figure 1B:
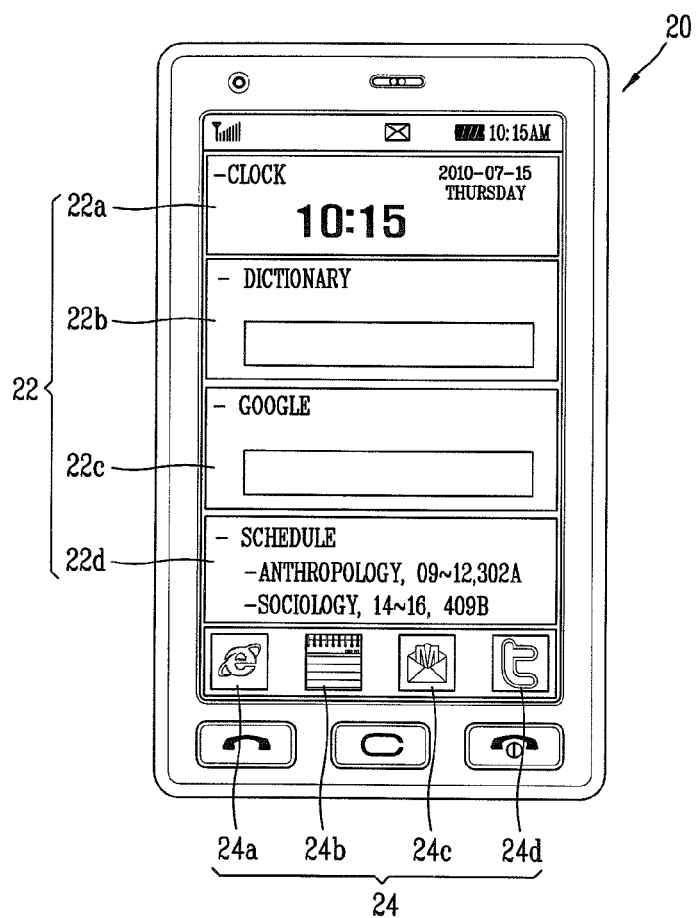

FIG. 1A and FIG. 1B are an overview of a display screen illustrating a process of changing of a menu configuration displayed on an idle screen of a mobile terminal according to an exemplary embodiment of the present invention.

With reference to FIG. 1A, when the time of the mobile terminal corresponds to a time between 7:00 a.m. and 9:00 a.m., menus may be displayed on an idle screen 10 of the mobile terminal according to a usage pattern (e.g., pattern of using the menus) of the user. For example, an item 12a related to a widget of an application indicating the current time, an item 12b related to a widget of a social network service application, and an item 12c related to a widget of a music player application may be displayed according to the frequently executed order in a first area 12 of the screen 10. Also, for example, an item 14a set to call a scheduler application, an item 14b set to call a news application, an item 14c set to call an e-mail application, and an item 14d set to call a Web browsing application may be displayed according to the frequently executed order in a second area 14 of the screen 10. In this example, since the mobile terminal has determined that the user has used the Twitter and music player applications most during the time period between 7:00 a.m. and 9:00 a.m., the screen 10 in the idle mode may display these applications along with the current time information on the screen 10. The applications that are displayed on the idle screen 10 may change periodically or as needed depending on how the use uses the mobile terminal (e.g., based on the usage pattern of the mobile terminal which may vary according to the current time).

As time passes, with reference to FIG. 1B, when the time of the mobile terminal corresponds to a time between 9:00 a.m. and 6:00 p.m., menus may be displayed on an idle screen 20 of the mobile terminal according to a usage pattern of the user. For example, an item 22a related to a widget of an application indicating a current time, an item 22b related to a widget of a dictionary application, an item 22c related to a widget of a search application, and an item 22d related to a scheduler application may be displayed according to the frequently executed order in a first area 22 of the screen 20. Also, for example, an item 24a set to call a Web browsing application, an item 24b set to call a notes application, an item 24c set to call an e-mail application, and an item 24d set to call a social network service application may be displayed according to the frequently executed order in a second area 24 of the screen. These applications may be displayed on the idle screen 20 since the mobile terminal has determined that these applications have been accessed or used most (or in certain order) by the user during this time period of each day according to the menu usage pattern of the user.

Although the item 12b related to the widget of the social network service application is displayed on the first area 12 of the idle screen 10 of FIG. 1A when the current time falls between 7 am and 9 am, the item 24d set to call the social network service application may be displayed on the second area 24 of the idle screen 20 of FIG. 1B (position changed) when the current time falls between 9 am and 6 pm. Also, the item 14d set to call the Web browsing application in the idle screen 10 of FIG. 1A is displayed at a fourth position from the left in the second area 22 when the current time falls between 7 am and 9 am, but the item 24a set to call the Web browsing application may be displayed at the first position from the left in the second area 24 of the idle screen 20 of FIG. 1B (order changed) when the current time falls between 9 am and 6 pm. Also, although the item 14a set to call the scheduler application is displayed with a first size on the idle screen 10 of FIG. 1A when the current time falls between 7 am and 9 am, the widget item 22d related to the scheduler application may be displayed with a second size larger than the first size on the idle screen 20 of FIG. 1B (size changed) when the current time falls between 9 am and 6 pm. Accordingly, based on the menu usage pattern for each time period, various applications/menus may be displayed on the idle screen of the mobile terminal that would be most suitable for the current time. As such, the present invention provides user interfaces (e.g., idle screen) that are automatically adapted to be most suitable for the user of the mobile terminal based on the user's menu usage pattern of the mobile terminal.

Figure 2:
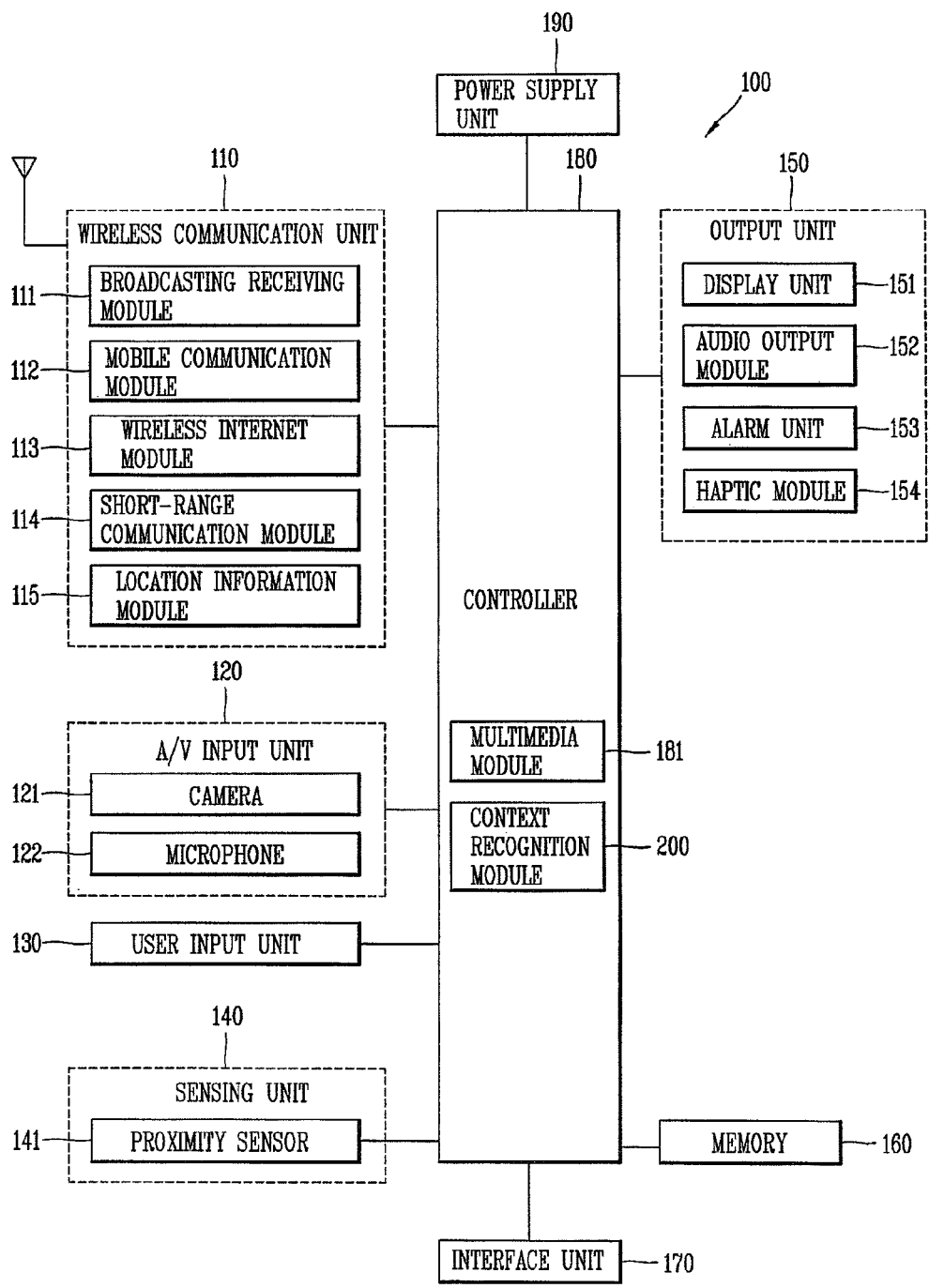
FIG. 2 is a schematic block diagram of a mobile terminal according to an exemplary embodiment of the present invention.

FIG. 2 is a block diagram of a mobile terminal 100 according to an embodiment of the present invention. The mobile terminal of FIGS. 1A and 1B can be the mobile terminal 100 or other suitable mobile terminal.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 2 shows the mobile terminal as having various components, but it should be understood that implementing all of the illustrated components is not a requirement. Greater or fewer components may alternatively be implemented. All the components of the mobile terminal 100 are operatively coupled and configured.

The elements of the mobile terminal will be described in detail as follows.

The wireless communication unit 110 preferably includes one or more components allowing radio communication between the mobile terminal 100 and a wireless communication system or a network in which the mobile terminal is located. For example, the wireless communication unit 110 may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160 (or anther type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal 100. This module may be internally or externally coupled to the terminal 100. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal 100. A typical example of the location information module is a GPS (Global Positioning System).

The A/V input unit 120 is configured to receive an audio and/or video signal. The A/V input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal 100.

The microphone 122 may receive sounds (audible data) via a microphone (or the like) in a phone call mode, a recording mode, a voice recognition mode, and the like, and can process such sounds into audio data. The processed audio (e.g., voice and other sounds) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate input data from commands entered by a user to control various operations of the mobile terminal 100. The user input unit 130 may include a keypad, a dome switch, a touch pad (e.g., a touch sensitive member that detects changes in resistance, pressure, capacitance, etc. due to being contacted), a jog wheel, a jog switch, a keyboard, a mouse, a remote controller, and the like.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (e.g., touch inputs), the orientation of the mobile terminal 100, an acceleration or deceleration movement and/or direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141. The sensing unit 140 or the mobile terminal 100 may include at least one of an acceleration sensor, a gyro sensor, a geomagnetic sensor, the proximity sensor 141, an illumination sensor, a temperature sensor, and a humidity sensor.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units (or other display means) according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

With reference to FIG. 2, the proximity sensor 141 may be disposed within or near the touch screen of the display unit 151. The proximity sensor 141 is a sensor for detecting the presence or absence of an object relative to a certain detection surface or an object that exists nearby by using the force of electromagnetism or infrared rays without a physical contact. Thus, the proximity sensor has a considerably longer life span compared with a contact type sensor, and it can be utilized for various purposes.

Examples of the proximity sensor may include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and the like. In case where the touch screen is the capacitance type, proximity of the pointer is detected by a change in electric field according to the proximity of the pointer. In this case, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it preferably means that the pointer is positioned to correspond vertically to the touch screen.

By employing the proximity sensor, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 (or other type of user notification means) may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (e.g., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152. The display unit 151 and the audio output module 152 may be classified as a part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include one or more of at least one type of storage medium including a Flash memory, a hard disk, a multimedia card micro type, a card-type memory (e.g., SD or DX memory, etc), a memory stick, a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet or other network.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

According to an exemplary embodiment of the present invention, the controller 180 may include a context recognition module 200. The context recognition module 200 will be described in detail later with reference to FIG. 4.

Figure 3A:
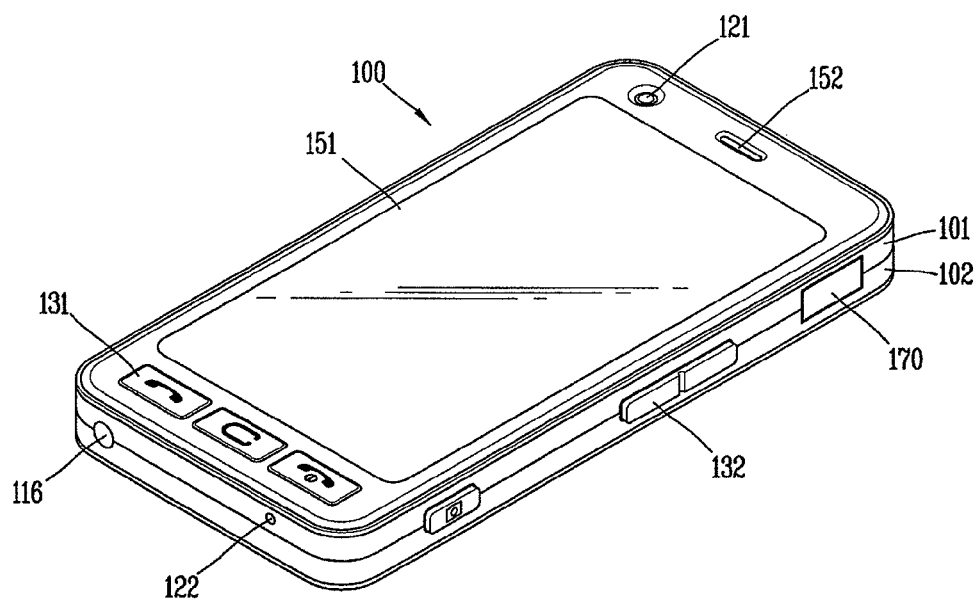
FIG. 3A is a front perspective view of the mobile terminal according to an exemplary embodiment of the present invention.

FIG. 3A is a front perspective view of the mobile terminal 100 according to an exemplary embodiment of the present invention.

Referring to FIG. 3A, the mobile terminal 100 includes a bar type terminal body. However, without being limited thereto, the present invention can be also applicable to a slide type mobile terminal, a folder type mobile terminal, a swing type mobile terminal, a swivel type mobile terminal and the like, including two or more bodies.

The terminal body of the mobile terminal 100 includes a case (or casing, housing, cover, etc.) constituting the external appearance of the terminal body. In the present exemplary embodiment, the case may be divided into a front case 101 and a rear case 102. Various electronic components are installed in the space between the front case 101 and the rear case 102. One or more intermediate cases may be additionally disposed between the front case 101 and the rear case 102. The cases may be formed by injection-molding a synthetic resin or may be made of a metallic material such as stainless steel (STS) or titanium (Ti), etc.

The display unit 151, the audio output module 152, camera 121, and the user input unit 130 (131, 132), the microphone 122, the interface 170, and the like, may be located on the terminal body, e.g., mainly on the front case 101.

The display unit 151 can occupy the most portion of the front surface of the front case 102. The audio output unit 151 and the camera 121 can be disposed at a region adjacent to one of both end portions of the display unit 151, and the user input unit 130 and the microphone 122 can be disposed at a region adjacent to another of the both end portions. The user input unit 132, the interface 170, and the like, may be disposed at the sides of the front case 101 and the rear case 102.

The user input unit 130 is manipulated to receive commands for controlling the operation of the mobile terminal 100, and may include a plurality of manipulation units 131 and 132. The manipulation units 131 and 132 may be generally called a manipulating portion, and they can employ any method so long as they can be manipulated in a tactile manner by the user.

Content inputted by the first and second manipulation units 131 and 132 may be variably set. For example, the first manipulation unit 131 receives commands such as start, end, scroll, or the like, and the second manipulation unit 132 may receive commands such as adjustment of size of a sound outputted from the audio output unit 152 or conversion to a touch recognition mode of the display unit 151.

Figure 3B:
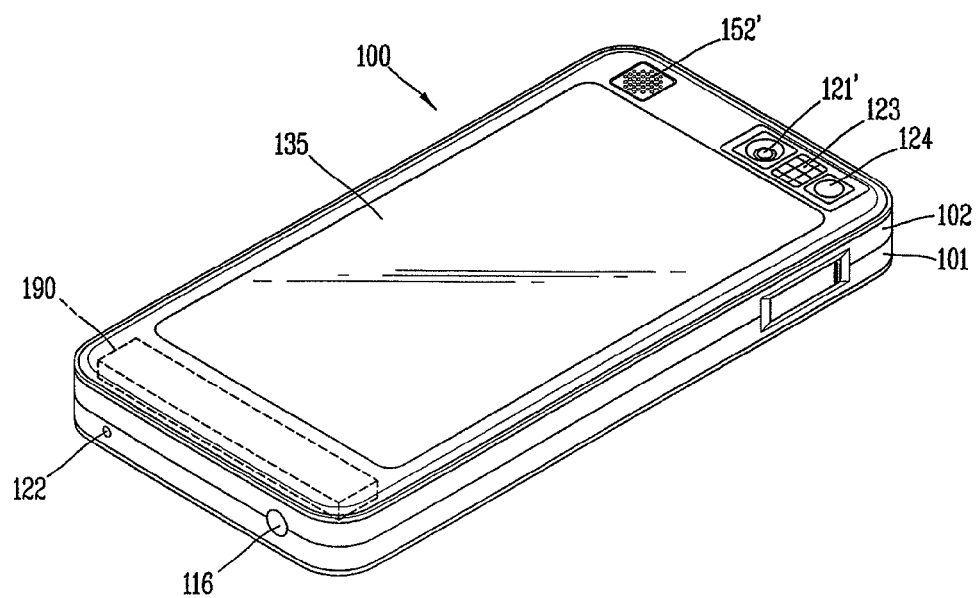
FIG. 3B is a rear perspective view of the mobile terminal according to an exemplary embodiment of the present invention.

FIG. 3B is a rear perspective view of the mobile terminal 100 illustrated in FIG. 3A according to an exemplary embodiment of the present invention.

With reference to FIG. 3B, a camera 121' may additionally be disposed on a rear surface of the terminal body, e.g., on the rear case 102. The camera 121' may have an image capture direction which is substantially opposite to that of the camera 121 (See FIG. 3A), and may support a different number of pixels (e.g., have a different resolution) than the camera 121.

For example, the camera 121 may operate with a relatively lower resolution to capture an image(s) of the user's face and immediately transmit such image(s) to another party in real-time during video call communication or the like. Meanwhile the camera 121' may operate with a relatively higher resolution to capture images of general objects with high picture quality, which may not require immediately transmission in real time. The cameras 121 and 121' may be installed on the terminal such that they are rotated or popped up.

A flash 123 and a mirror 124, may be additionally disposed adjacent to the camera 121'. When an image of the subject is captured with the camera 121', the flash 123 illuminates the subject. The mirror 124 allows the user to see himself when he wants to capture his own image (e.g., self-image capturing) by using the camera 121'.

An audio output unit 152' may be additionally disposed on the rear surface of the terminal body. The audio output unit 152' may implement a stereoscopic function along with the audio output unit 152 (See FIG. 3A), and may be used for implementing a speaker phone mode during call communication.

A broadcast signal receiving antenna may be disposed at the side of the terminal body in addition to an antenna that supports mobile communications. The antenna 116 forming a portion of the broadcasting receiving module 111 (in FIG. 2) may be installed to be protracted.

The power supply unit 190 for supplying power to the mobile terminal 100 may be mounted on the terminal body 101. The power supply unit 190 may be installed in the terminal body or may be directly detached from the outside of the terminal body.

A touch pad 135 for detecting a touch may be additionally mounted on the rear case 102. Such touch pad 135 may be configured to be light-transmissive like the display unit 151. In this case, when the display unit 151 is configured to output visual information from both sides thereof, the visual information can be recognized through the touch pad 135. Information outputted to the both sides of the display unit 151 may be all controlled by the touch pad 135. Alternatively, a display may be additionally mounted on the touch pad 135, and a touch screen may be disposed on the rear case 102.

The touch pad 135 is operated in relation to the display unit 151 of the front case 101. The touch pad 135 may be disposed to be parallel to the rear side of the display unit 151. The touch pad 135 may have the same size or smaller than the display unit 151.

Various types of visual information may be displayed on the display unit 151. The information may be displayed in the form of character, number, symbol, graphic, icon, etc. In order to input the information, at least one of the character, number, symbol, graphic and icon is displayed in a certain arrangement so as to be implemented in the form of a keypad. Such keypad may be so-called 'soft key'.

A control method that may be implemented in the terminal configured as described above according to exemplary embodiments of the present invention will now be described with reference to the accompanying drawings. The exemplary embodiments to be described may be solely used or may be combined to be used. Also, the exemplary embodiments to be described may be combined with a user interface (UI) so as to be used.

Changing or Maintaining a Menu Configuration Displayed on Idle Screen

Figure 4:
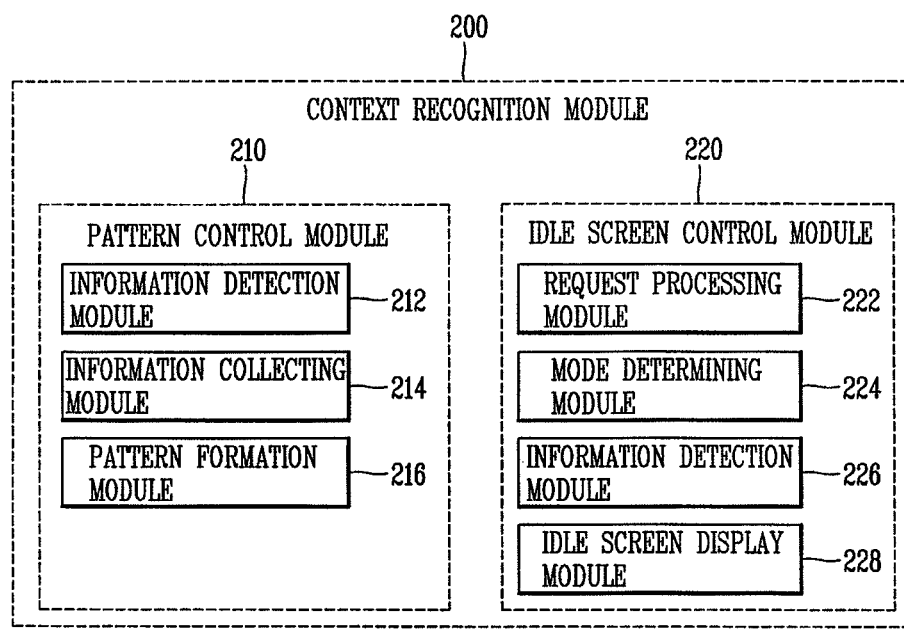
FIG. 4 is a detailed block diagram of a context recognition module 200 illustrated in FIG. 2.

FIG. 4 is a detailed block diagram of the context recognition module 200 illustrated in FIG. 2 according to an embodiment of the invention. The context recognition module 200 according to an exemplary embodiment of the present invention includes a pattern control module 210 and an idle screen control module 220.

The pattern control module 210 collects status information of the mobile terminal 100 and menu usage information detected when menus are used, and forms a usage pattern on the basis of the collected status information and/or the collected menu usage information. The pattern control module 210 includes an information detection module 212, an information collecting module 214, and a pattern formation module 216.

The information detection module 212 transmits the status information of the mobile terminal 100 and the menu usage information such as the number of executions, execution duration, and the like, of menus detected by hardware such as a sensor, or the like, and software such as Web-related menus when menus are in use, to the information collecting module 214.

The information collecting module 214 collects the status information of the mobile terminal 100 and the menu usage information received from the information detection module 212 when menus are in use, and transmits the collected information to the pattern formation module 216. In an exemplary embodiment of the present invention, the information collecting module 214 may collect the status information of the mobile terminal 100 and the menu usage information during a pre-set period for multiple time periods. For instance, each day may be divided into preset periods and the status of the mobile terminal as well as how the menus are used or accessed by the user during each preset period may be collected and tabulated. The status information preferably includes at least one of information regarding a time of the mobile terminal, information regarding a location of the mobile terminal, and information detected through at least one of sensors provided in the mobile terminal. The menu usage information preferably includes information regarding at least one of the number of executions of one or more of the menus displayed on the screen and an execution duration of the one or more of the menus displayed on the screen The pattern formation module 216 recognizes a menu usage pattern on the basis of the status information of the mobile terminal 100 and/or the menu usage information received from the information collecting module 214, and transmits the formed usage pattern to the idle screen control module 220. In an exemplary embodiment of the present invention, the pattern formation module 216 determines the menu usage pattern by identifying one or more of menus used frequently in a periodically repeated status. For instance, if the user uses a music player application/menu of the mobile terminal every morning or most frequently in the mornings, then the pattern formation module 216 may recognize that the menu usage pattern for the mornings is using the music player application.

The idle screen control module 220 determines a display mode of the idle screen and changes or maintains the configuration of the menus displayed on the idle screen on the basis of the display mode of the idle screen. The idle screen control module 220 includes a request processing module 222, a mode determining module 224, an information detection module 226, and a idle screen display module 228.

The request processing module 222 receives an idle screen display request (e.g., a normal idle screen command from the controller 180 of the mobile terminal 100) and transmits the received request to the mode determining module 224.

Figure 15:
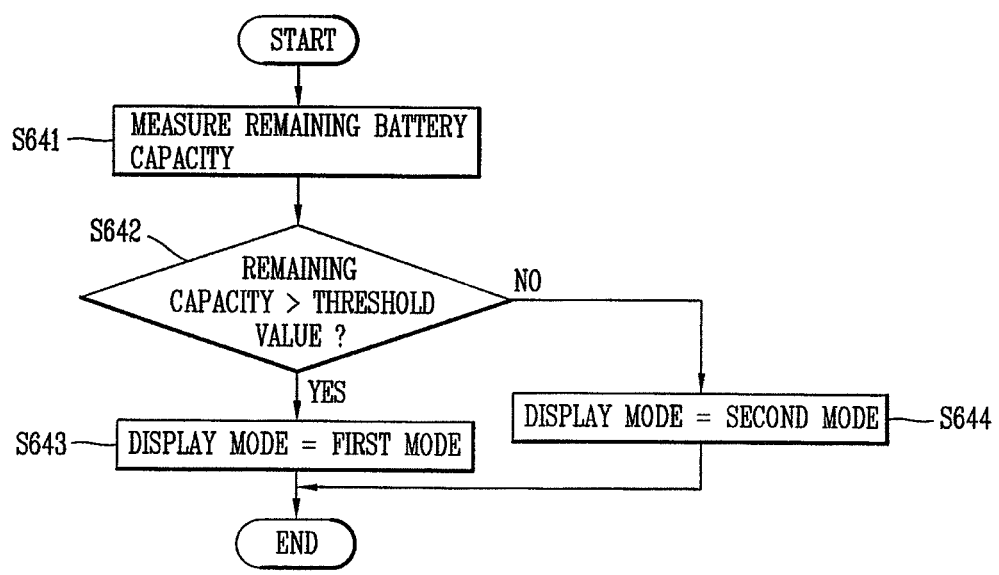
FIG. 15 is a flow chart illustrating the process of determining a display mode of an idle screen of a mobile terminal according to an exemplary embodiment of the present invention.

The mode determining module 224 determines whether or not the current idle screen display mode is to be a mode for changing the idle screen according to a usage pattern (e.g., menu usage pattern determined from the pattern control module 210) or a mode for maintaining the idle screen regardless of the usage pattern, and transmits information regarding the determined idle screen mode to the idle screen display module 228. Preferably, the mode determining module 224 receives a command for changing the display mode of the idle screen and interchanges the mode for changing the idle screen according to the usage pattern and the mode for maintaining the idle screen regardless of the usage pattern. This command may be provided by the user or can be provided by the controller depending on other information, e.g., remaining battery capacity information of the mobile terminal as shown in FIG. 15 to be discussed later.

The information detection module 226 detects certain information of the mobile terminal 100 through hardware such as a sensor, and the like, or software such as a Web-related menu, and the like, according to a request from the idle screen display module 228, and transmits the detected information to the idle screen display module 228. Such information of the mobile terminal 100 may be information about the state of the mobile terminal, the status of the mobile terminal, the position of the mobile terminal, the configuration of the mobile terminal, etc. Such information is used by the idle screen display module 228 to how to switch at least one configuration of the mobile terminal according to the determined mode.

The idle screen display module 228 reads the information regarding the mode received from the mode determining module 224. When the determined mode is the mode for changing the idle screen according to the usage pattern, the idle screen display module 228 requests certain information (e.g., state information, status information, etc.) of the mobile terminal from the information detection module 226, and changes one or more configurations of menus displayed (or to be displayed) on the idle screen on the basis of the certain information received from the information detection module 226 and the usage pattern received from the pattern formation module 216. However, when the determined mode is the mode for maintaining the idle screen regardless of the usage pattern, the idle screen display module 228 maintains a default configuration of the menus as displayed on the idle screen. For instance, there would be no change to the configuration of the menus displayed on the idle screen.

In an exemplary embodiment of the present invention, the idle screen display module 228 may compare previously status information and current status information of the mobile terminal at certain time periods (obtained from the information detection module 226), and change the configuration(s) of the menus displayed on the idle screen on the basis of the previous status information or current status information and/or the usage pattern according to the comparison result. For example, the idle screen display module 228 may compare a previous position and a current position of the mobile terminal 100 at a certain period. When the previous position corresponds to a first state and the current position corresponds to a second state different from the first state (e.g., menu configurations are different), the idle screen display module 228 may maintain the configurations of the menu displayed on the idle state corresponding to the first state. When the previous position corresponds to the second state and the current position corresponds to the first state, the idle screen display module 228 may change the configuration of the menu displayed on the idle screen into the configuration of the menu corresponding to the second state. Accordingly, the menu configuration displayed on the idle screen in the boundary of the state can be seamlessly changed.

According to an embodiment, the idle screen display module 228 changes one or more configurations of the menus displayed (or to be displayed) on the idle screen of the mobile terminal according to the mode determined by the mode determining module 224, which in turn has determined whether the menu configurations need to be changed based on the menu usage pattern determined by the pattern information module 216.

According to an embodiment, the one or more configurations of the menus of the idle screen changed by the idle screen display module may include at least one of a position, size, and order of the menus to be displayed on the idle screen. For instance, depending on the menu usage pattern, the positions, sizes, and/or order of the menus displayed on the idle screen may change, e.g., depending on the current time. Such examples are illustrated in FIGS. 1A and 1B discussed above. For instance, different menus may be displayed on the idle screen depending on the current time.

FIG. 5 illustrates an example of a pattern table 300 according to an exemplary embodiment of the present invention. The pattern table 300 stores or include information regarding an identification number/time (e.g., start time, end time, etc.)/area (e.g., start area/arrival area, etc.)/used menu according to a menu usage history of the user at the mobile terminal. With reference to FIG. 5, it is noted that the pattern table 300 stores eight contexts and their corresponding information according to the context. For example, the user may have a pattern that he frequently uses the clock, to-do list, stock menus in the office from 9:00 a.m. to 6:00 p.m. A usage pattern is then obtained for each situation and/or time frame and/or location, etc., which is preferably referred to here as a context. The pattern formation module 216 can store the pattern table 300 which identifies the menu usage pattern.

FIGS. 6A to 6D illustrate various configurations of menus displayed on an idle screen of the mobile terminal 100 according to an exemplary embodiment of the present invention. These are examples of the configurations of the menus that can be displayed on the idle screen of the mobile terminal 100, which have been set or varied according to the menu usage pattern determined by the context recognition module 200.

Figure 6A:
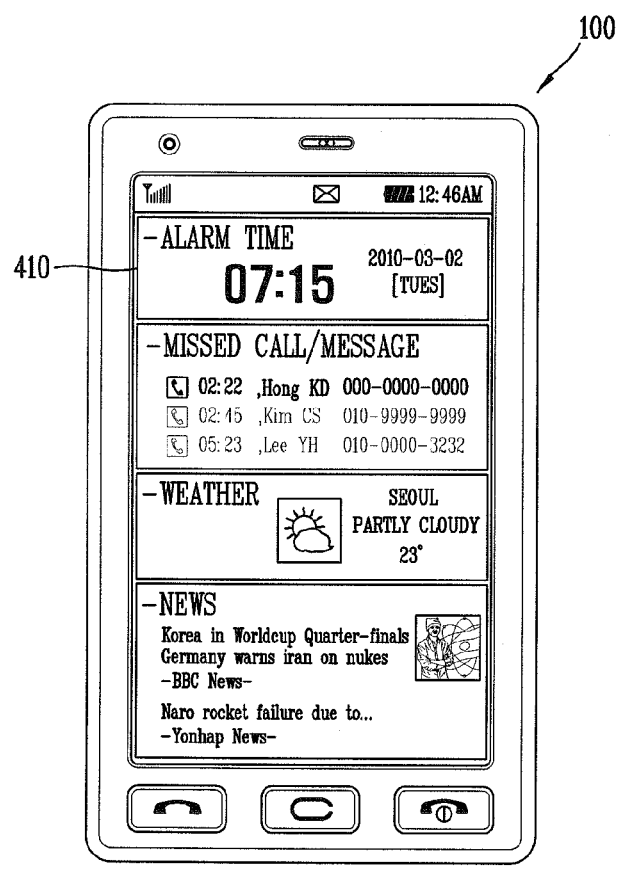
FIGS. 6A to 6D illustrate configurations of menus displayed on an idle screen of a mobile terminal according to an exemplary embodiment of the present invention.
Figure 6B:
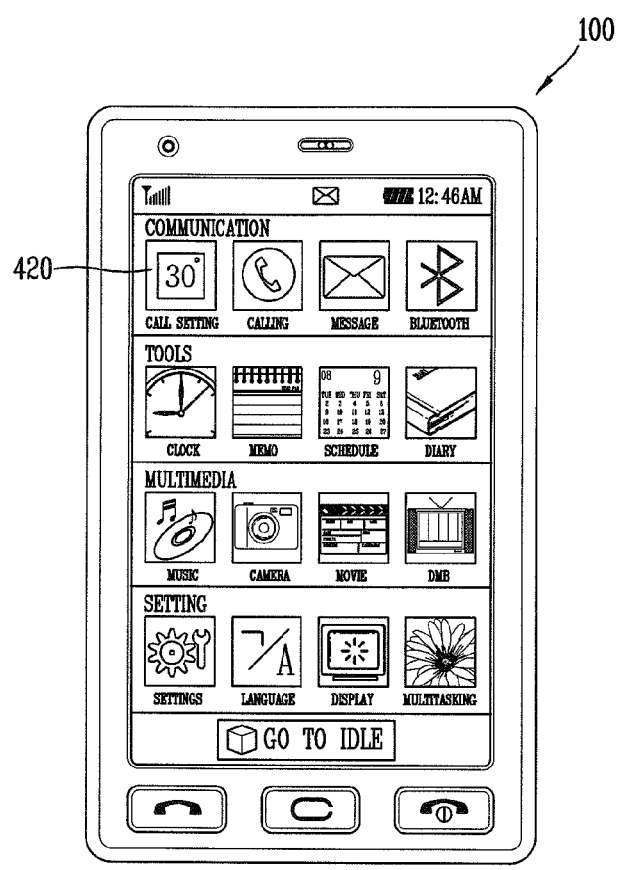

With reference to FIG. 6A, the idle screen of the mobile terminal 100 may include items 410 in relation to the execution of widgets among menus provided in the mobile terminal 100. The items 410 in relation to the execution of the widgets may be automatically executed as they are displayed on the idle screen or may be executed manually while being displayed on the idle screen according to a setting of the mobile terminal 100. With reference to FIG. 6B, the idle screen of the mobile terminal 100 may include items 420 in relation to the execution of applications among menus provided in the mobile terminal 100. The items 420 in relation to the execution of the applications may include brief information (e.g., icon or thumbnail image) in relation to the execution of the applications.

Figure 6C:
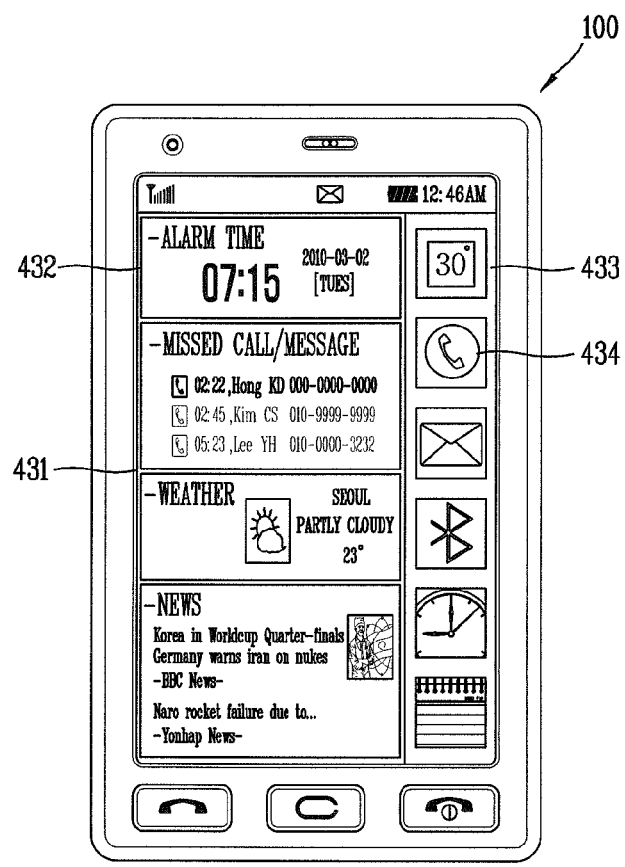

With reference to FIG. 6C, the idle screen of the mobile terminal 100 may include a first area 431 including items 432 in relation to the execution of the widgets among the menus and a second area 433 including items 434 in relation to the execution of the applications among the menus. Here, the first area 431 and the second area 433 are contiguous and divide the idle screen in a horizontal direction. However, these areas 431 and 433 may divide the idle screen in a different direction such as a vertical direction. Further, the idle screen may be divided into any number of areas.

Figure 6D:
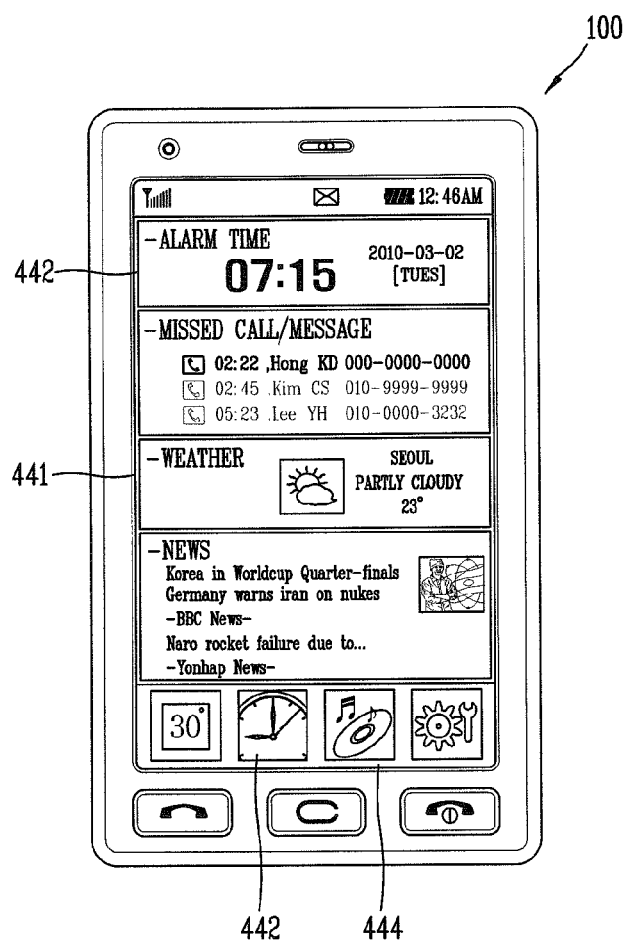

With reference to FIG. 6D, the idle screen of the mobile terminal 100 may include a first area 441 including items 442 in relation to the execution of the widgets among the menus and a second area 443 including items 444 in relation to the execution of the applications among the menus. Here, the first area 441 and the second area 443 are contiguous and divide the idle screen in the vertical direction.

Figure 7A:
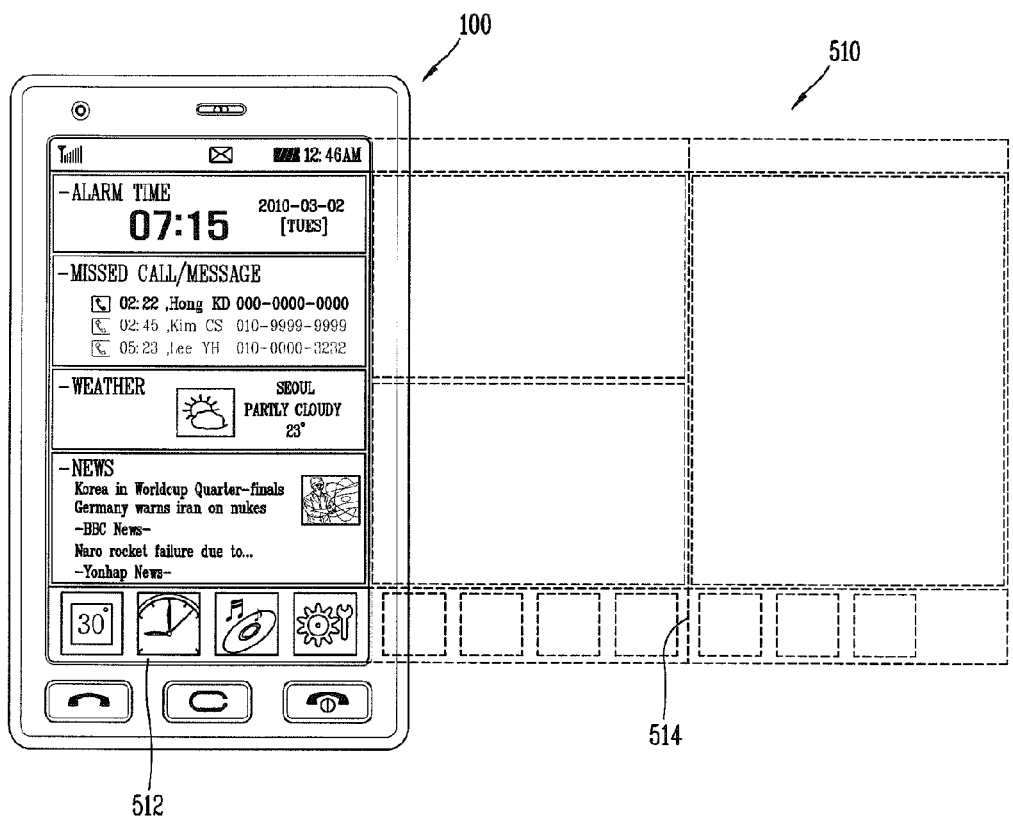
FIGS. 7A and 7B illustrate configurations of menus displayed on an idle screen of a mobile terminal according to an exemplary embodiment of the present invention.
Figure 7B:
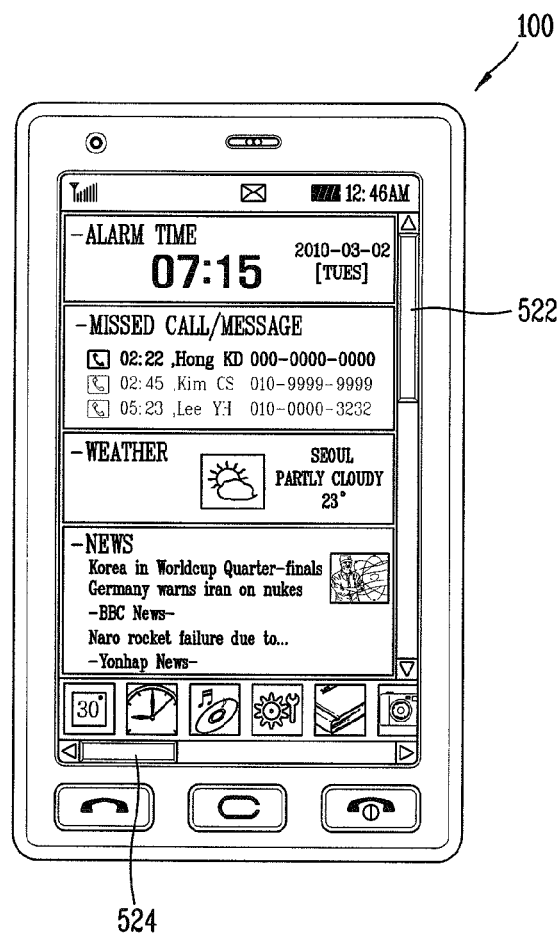

FIGS. 7A and 7B illustrate configurations of menus displayed on an idle screen of the mobile terminal 100 according to an exemplary embodiment of the present invention.

With reference to FIG. 7A, an idle screen 510 of the mobile terminal 100 includes an area 512 actually displayed (e.g., visible to the user) on the display unit 151 and an area 514 virtually displayed (e.g., hidden from the user) on the display unit 151. For example, when menus frequently used in a particular context cannot be all displayed on one screen, the actually displayed area 512 may include and display menus of higher frequency of use, and the virtually displayed area 514 may include menus of lower frequency of use. In this case, the screen of the actually displayed area 512 and the screen of the virtually displayed area 514 may be interchanged according to a screen interchange request such as a drag or the like. For instance, the menus on the virtually displayed area 514 are not visible to the user looking at the screen of the mobile terminal 100. Such menus may be visibly displayed to the user according to the user's command.

With reference to FIG. 7B, the idle screen of the mobile terminal 100 may include scroll tools (e.g., scroll bars 522 and 524). For example, when menus frequently used in a particular context cannot be all displayed on one screen, the mobile terminal 100 may scroll those menus not visibly displayed on the screen and display them to be visible on the screen on the basis of a drag or touch input of the search tools 522 and 524 received from the user.

Figure 8:
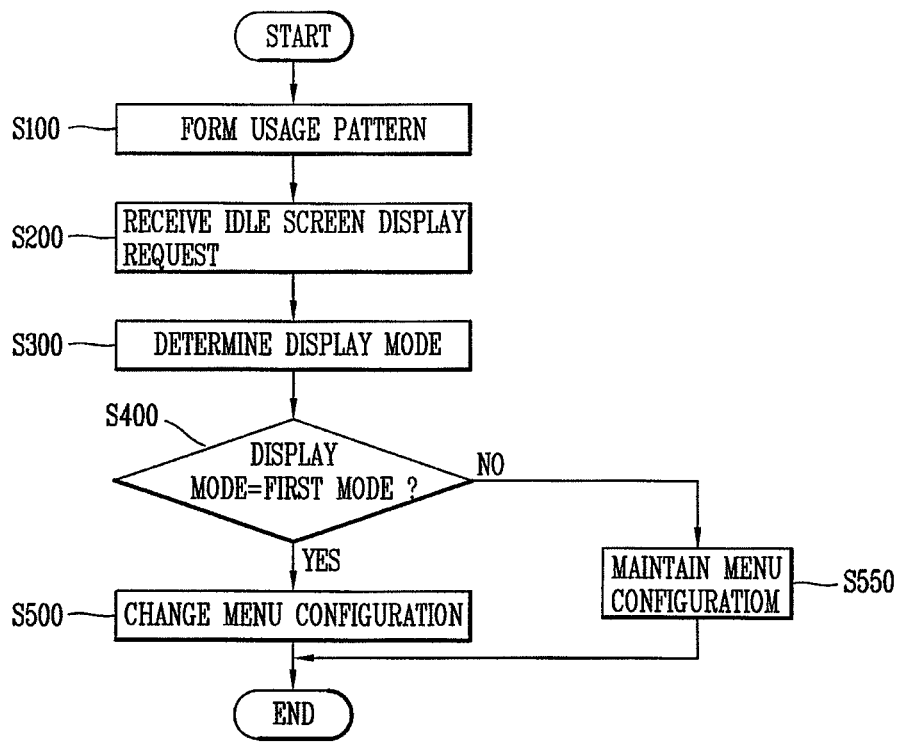
FIG. 8 is a flow chart illustrating the process of changing or maintaining a menu configuration displayed on the idle screen according to an exemplary embodiment of the present invention.

FIG. 8 is a flow chart illustrating the process of changing or maintaining a menu configuration displayed on the idle screen of the mobile terminal according to an exemplary embodiment of the present invention.

Referring to FIG. 8, the pattern control module 210 collects the status information of the mobile terminal 100 detected when menus are in use and menu usage information, and forms a usage pattern on the basis of the collected information as discussed above (S100).

The request processing module 222 receives an idle screen display request (e.g., from the controller of the mobile terminal 100 when the mobile terminal is to enter an idle mode), and transmits the received request to the mode determining module 224 (S200).

The mode determining module 224 determines whether or not the display mode of the idle screen is to be the mode for changing the idle screen according to the usage pattern or the mode for maintaining the idle screen regardless of the usage pattern, and transmits information regarding the determined mode to the idle screen display module 228 (S300). The user can set that the idle screen be maintained at its default configuration regardless of the usage menu pattern.

The idle screen display module 228 reads the information regarding the mode received from the mode determining module 224. Also, the idle screen display module 228 determines whether or not the read mode is the mode for changing the idle screen according to the usage pattern (S400).

When the read mode is the mode for changing the idle screen according to the usage pattern in step S400, the idle screen display module 228 requests certain information (e.g., state, status, etc.) of the mobile terminal 100 from the information detection module 226, and changes one or more display configurations of the menus displayed (or to be displayed) on the idle screen on the basis of the status information received from the information detection module 226 and/or the usage pattern received from the pattern formation module 216 (S500).

Meanwhile, if the read mode is the mode for maintaining the idle screen regardless of the usage pattern in step S400, the display module 228 maintains the default configuration of the menus displayed on the idle screen (S550).

Figure 9:
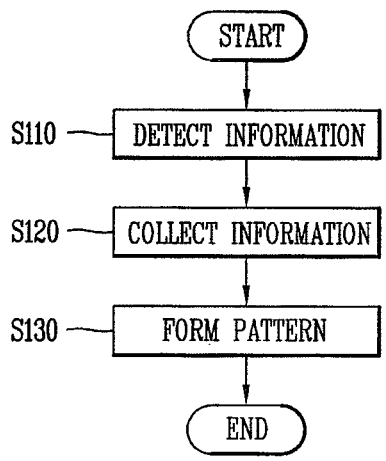
FIG. 9 is a detailed flow chart illustrating the process of forming a usage pattern illustrated in FIG. 8.

FIG. 9 is a detailed flow chart illustrating the process of forming a usage pattern illustrated at step S100 of FIG. 8.

The information detection module 212 detects status information of the mobile terminal 100 through the hardware such as the sensor, or the like, or the software such as the Web-related menu, or the like, when menus are in use, detects menu usage information such as the number of times of execution of menus, menu execution duration, and the like, and transmits the corresponding information to the information collecting module 214 (S110).

The information collecting module 214 collects the status information of the mobile terminal 100 and the menu usage information received from the information detection module 212, and transmits the same to the pattern formation module 216 (s120).

The pattern formation module 216 forms a menu usage pattern on the basis of the status information of the mobile terminal 100 and/or the menu usage information received from the information collecting module 214, and transmits the formed usage pattern to the idle screen control module 220 (S130).

Figure 10A:
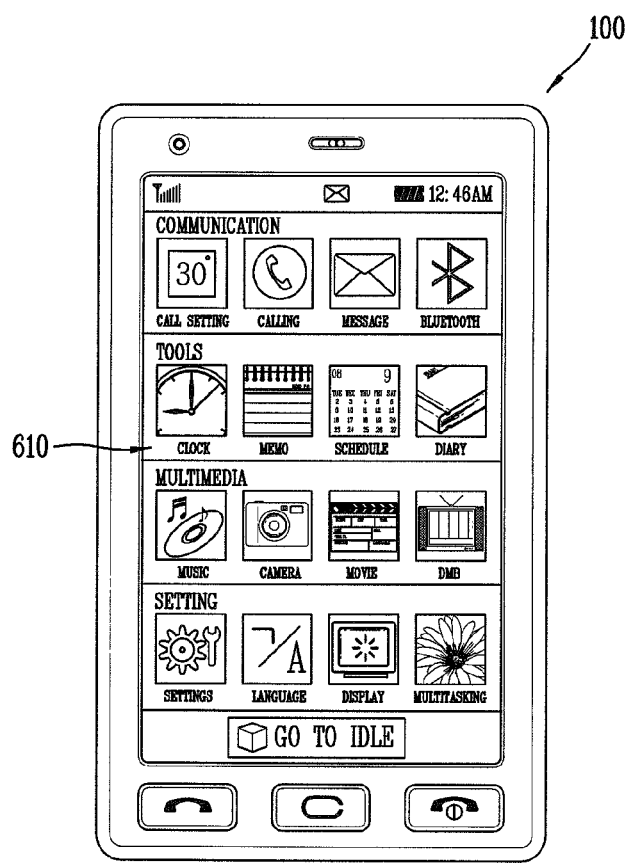
FIGS. 10A and 10B illustrate examples of an idle screen of a mobile terminal according to an exemplary embodiment of the present invention.
Figure 10B:
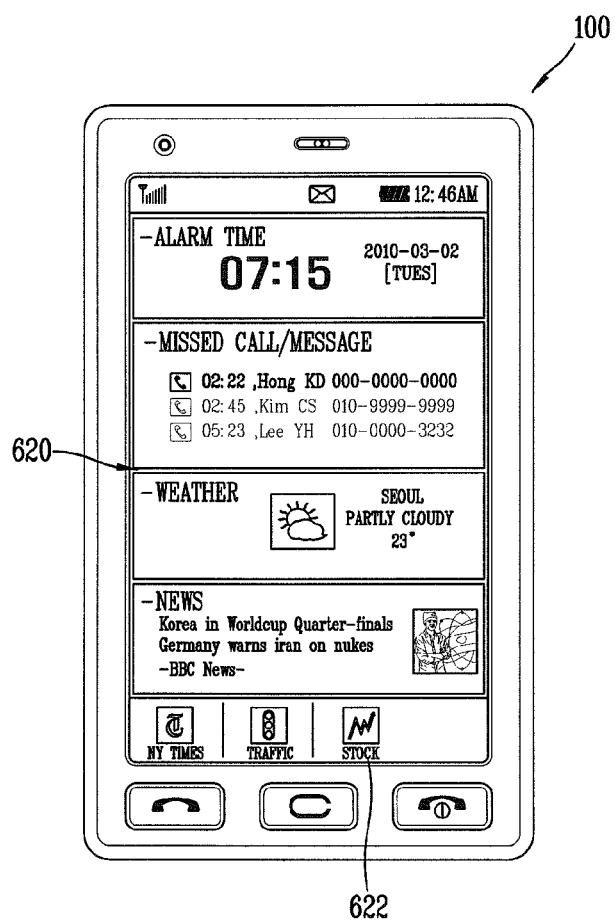

FIGS. 10A and 10B illustrate examples of idle screens of the mobile terminal 100 according to an exemplary embodiment of the present invention.

With reference to FIG. 10A, when the idle screen display mode of the mobile terminal 100 is the mode for maintaining the idle screen regardless of the usages pattern (which may be set by the user or may be set based on other information such as the remaining battery information of the mobile terminal as shown in FIG. 15), the configurations of the menus 610 displayed on the idle screen are maintained as the configuration (default configuration) which has been previously set or set by the user regardless of the usage pattern of the mobile terminal 100. Thus as shown, regardless of the usage pattern determined, the idle screen displays the same menus in the same configuration.

On the other hand, with reference to FIG. 10B, when the idle screen display mode is the mode for changing the idle screen according to the usage pattern (e.g., if the user has authorized the operation of changing the idle screen menus depending on the contexts), one or more display configurations of the menus 620 displayed on the idle screen are changed on the basis of the status information of the mobile terminal 100 and/or the usage pattern. For example, with reference to the pattern table 300 of FIG. 5, the idle screen of FIG. 10B now displays alarm, missed call/message, weather, and news items, namely, the menus which were frequently executed when the user used the mobile terminal 100 at his place from 7:00 a.m. to 8:00 a.m.

Pattern Editing Function

FIG. 11 is a flow chart illustrating the process of editing a pattern of the mobile terminal according to an exemplary embodiment of the present invention.

Referring to FIG. 11, in a state that the idle screen control module 220 displays the idle screen, the pattern control module 210 provides a screen allowing for editing the determined usage pattern or the pattern table such as the table 300 of FIG. 5. The pattern control module 210 receives a pattern editing command through the user input unit 130 (S612).

Upon receiving the pattern editing command, the pattern control module 210 edits, for example, time, places, and user menus corresponding to each context on the basis of the pattern editing command, and stores the edited pattern in the memory 160 (S614). For instance, even though the pattern formation module 216 determines the menu usage pattern based on the actual menu uses by the user of the mobile terminal, the user can modify the determined menu usage pattern so that it would be most suitable for the user's preferred menu configurations of the idle screen.

Menu Deletion Function

FIG. 12 is a flow chart illustrating the process of deleting a menu of the mobile terminal according to an exemplary embodiment of the present invention.

Referring to FIG. 12, in a state that the idle screen control module 220 displays the idle screen, the idle screen control module 220 receives a command for deleting one or more menus selected by the user from among the menus displayed on the idle screen (S621). This command may be input form the user.

The idle screen control module 220 excludes the one or more menus selected by the user from the idle screen and changes the configuration(s) of the menus displayed on the idle screen (e.g., the idle screen control module 220 deletes the one or more selected menus from the idle screen) (S622). For instance, the user may select to remove certain menus from the list of menus that can be displayed on the idle screen, and thereby ensures that certain menus are not displayed at all on the idle screen according to the user's preference, regardless of the determined usage pattern.

The idle screen control module 220 conforms the setting of the menu deletion stored in the memory 160 (S623). And then, the idle screen control module 220 determines whether or not the setting of the menu deletion has been set to delete one or more menus from the memory 160 (S624).

When the setting of the menu deletion has been set to delete the menu(s) from the memory 160 in step S624, the idle screen control module 220 deletes the(s) menu from the memory 160 (S625).

The idle screen control module 220 determines whether or not the setting of the menu deletion has been set to add a menu to replace the menu which has been deleted from the idle screen (S626).

When the setting of the menu deletion has been set to add a menu to replace the menu which has been deleted from the idle screen in step S626, the idle screen control module 220 adds a menu to replace the deleted menu (e.g., a menu of the highest frequency of use in a context corresponding to current status information among the menus not displayed on the idle screen) on the basis of the usage pattern (S627). Accordingly, the user can modify (e.g., delete, add, replace, etc.) a list of menus that can be displayed on the idle screen according to the menu usage pattern.

Figure 13A:
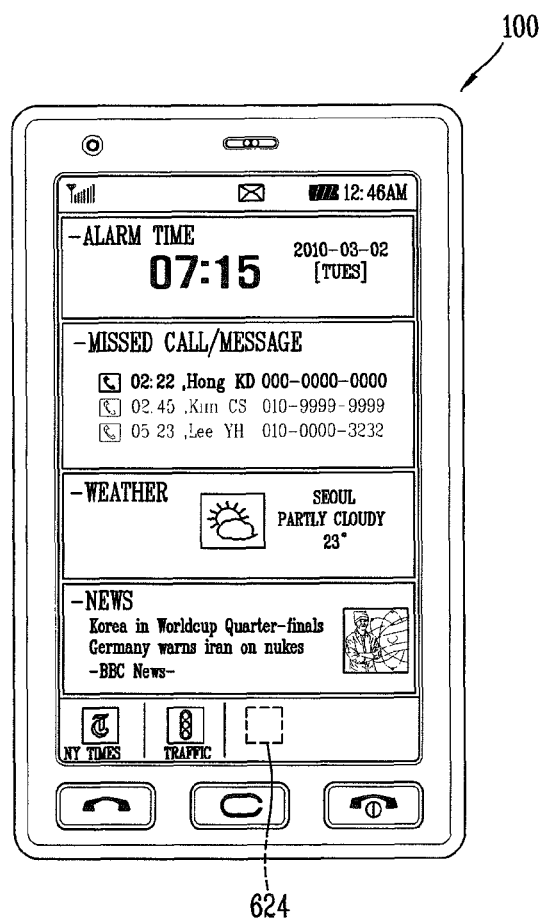
FIGS. 13A and 13B illustrate examples of UIs for deleting a menu from an idle screen of a mobile terminal according to an exemplary embodiment of the present invention.
Figure 13B:
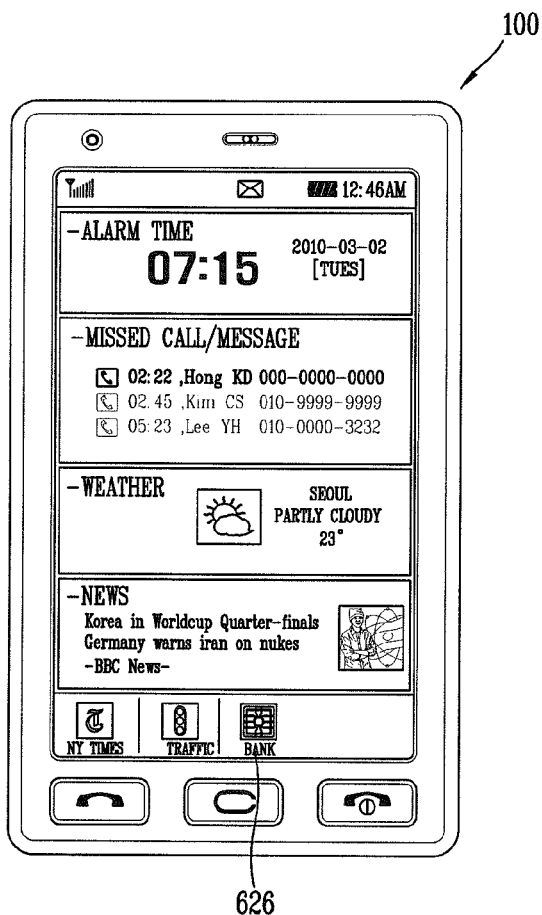

FIGS. 13A and 13B illustrate UIs for deleting a menu from an idle screen of the mobile terminal according to an exemplary embodiment of the present invention.

First, a particular menu 622 may be selected by the user from among the menus displayed on the idle screen with reference to FIG. 10B. When a command for deleting the particular menu 622 selected by the user is received from the user, the selected particular menu 622 is deleted from the idle screen to form a blank 624 as shown in FIG. 13A. In addition (e.g., optionally), the selected particular menu 622 may be deleted from the memory 160 according to a setting of the menu deletion.

Meanwhile, with reference to FIG. 13B, it is noted that, when the setting of the menu deletion has been set to add a menu to replace the menu 622 which has been deleted from the idle screen, a new menu 626 is added to replace the deleted menu 622 on the basis of the usage pattern. The user may select the new menu 626 to be added or the controller may select and add the new menu on the idle screen based on the menu usage pattern.

Idle Screen Display Mode Determining Function

Figure 14:
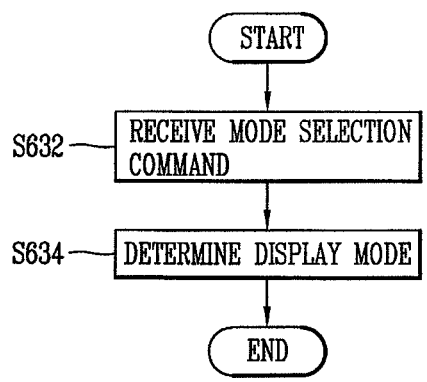
FIG. 14 is a flow chart illustrating the process of determining a display mode of an idle screen of a mobile terminal according to an exemplary embodiment of the present invention.

FIG. 14 is a flow chart illustrating the process of determining a display mode of an idle screen of the mobile terminal according to an exemplary embodiment of the present invention.

The idle screen control module 220 receives a command for selecting one of the mode for changing the idle screen according to the usage pattern and the mode for maintaining the idle screen regardless of the usage pattern through the user input unit 130 (S632). This command may be provided by the user or can be provided by the controller as shown in FIG. 15 to be discussed later.

The idle screen control module 220 determines a display mode of the idle screen on the basis of the received command (S634). For instance, if the user's command indicates that the user desires the idle screen menus to be updated according to the usage pattern, then the methods of changing the idle screen menu configurations are applied. If, on the other hand, the user's command indicates that such operations are not desired, then the idle screen menus are not changed and are maintained regardless of the menu usage patterns. The idle screen control module 220 may store the determined display mode in the memory (160).

FIG. 15 is a flow chart illustrating the process of determining a display mode of an idle screen of the mobile terminal according to an exemplary embodiment of the present invention.

Referring to FIG. 15, the idle screen control module 220 measures the remaining battery capacity of the mobile terminal 100 (S641) and compares the remaining battery capacity of the mobile terminal 100 with a threshold value stored in the memory 160 (S642).

When the remaining battery capacity exceeds or equals the threshold value, for example, when the threshold value is 10% and the remaining battery capacity is 50%, in step S642, the idle screen control module 220 determines that the mode for changing the idle screen according to the usage pattern can be the current idle screen display mode (S643). This is because changing the menu configuration requires checking of the status information and/or usage information, which uses additional resources such as power.

When the remaining battery capacity does not exceed the threshold value, for example, when the threshold value is 10% and the remaining battery capacity is 5%, in step S642, the idle screen control module 220 determines the mode for maintaining the idle screen regardless of the usage pattern should be the current idle screen display mode. Thus the controller of the mobile terminal can determine whether or not the operation of changing the idle screen menus is to be applied based on the current battery capacity (or other information) of the mobile terminal.

According to exemplary embodiments of the present invention, because the mobile terminal automatically configures the idle screen optimized for the usage pattern of the user, the utilization of the menus needed according to contexts can be maximized and the user can feel that he is provided with a life-close coverage service. The mobile terminal providing an idle screen that dynamically changes on the basis of the status information and/or usage pattern of the mobile terminal analyzed through various sensors and the method for configuring the idle screen by using the apparatus use hardware and software provided in the mobile terminal, so the cost can be reduced.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A method for configuring a screen of a mobile terminal, comprising:
   collecting, by the mobile terminal, status information of the mobile terminal and usage information of the mobile terminal while menus displayed on the screen of the mobile terminal are used, wherein the status information includes location information of the mobile terminal recognized through at least one of a global positioning system (GPS), 3G network, or Wi-Fi network;
   forming a menu usage pattern based on at least one of the status information or the usage information;
   displaying menus in a first configuration on the screen based on the menu usage pattern and first status information of the mobile terminal detected when the screen enters an idle mode;
   comparing the first status information and second status information of the mobile terminal detected at a predetermined time period from since the screen enters the idle mode; and
   changing the menus from the first configuration to a second configuration based on a difference between the first status information and the second status information,
   wherein the first status information is different from the second status information and the menus in the first configuration are different from the menus in the second configuration.

2. The method of claim 1, wherein the screen is displayed in a default configuration if the mobile terminal is turned on or if an input for setting the screen in the default configuration is received.

3. The method of claim 1, wherein the status information includes at least one of information regarding a time of the mobile terminal, information regarding a location of the mobile terminal, and information detected through at least one of sensors provided in the mobile terminal, and
   wherein the usage information includes information regarding at least one of the number of executions of one or more of the menus displayed on the screen and an execution duration of the one or more of the menus displayed on the screen.

4. The method of claim 1, further comprising:
   receiving a command for editing the formed menu usage pattern; and
   editing the formed menu usage pattern based on the command, wherein a configuration of the menus for the screen in the idle mode is changed based on the edited menu usage pattern.

5. The method of claim 1, further comprising:
   deleting at least one specific menu among the menus displayed on the screen in the idle mode in response to an input thereof.

6. The method of claim 1, further comprising:
   determining, by the mobile terminal, a remaining battery capacity of the mobile terminal; and
   changing the menus to a third configuration based on the determined remaining battery capacity.

7. The method of claim 1, wherein the menus include selectable items for execution of one or more applications.

8. The method of claim 1, wherein the usage information includes information regarding whether to delete one or more of the menus displayed or to be displayed on the screen.

9. The method of claim 1, wherein the screen in the idle mode includes a first area for displaying an item in relation to an execution of a widget among the menus displayed on the screen, and a second area for displaying an item in relation to an execution of an application among the menus displayed on the screen.

10. The method of claim 1, wherein the menus in the first configuration are different from the menus in the second configuration with respect to at least one of a position, a size, or an order of the menus displayed on the idle-screen.

11. The method of claim 1, wherein the status information is collected from information obtained through at least one sensor provided in the mobile terminal, and
   the at least one sensor includes at least one of an acceleration sensor, a gyro sensor, a geomagnetic sensor, a proximity sensor, an illumination sensor, a temperature sensor, or a humidity sensor.

12. A mobile terminal comprising:
   a display unit including a screen; and
   a controller configured to:
   collect status information of the mobile terminal and usage information of the mobile terminal while menus displayed on the screen of the mobile terminal are used, wherein the status information include location information of the mobile terminal recognized through at least one of a global positioning system (GPS), 3G network, or Wi-Fi network;
   form a menu usage pattern based on at least one of the status information or the usage information;
   display menus in a first configuration on the screen based on the menu usage pattern and first status information of the mobile terminal detected when the screen enter an idle mode;
   compare the first status information and second status information of the mobile terminal detected at a predetermined time period from since the screen enters the idle mode; and
   change the menus from the first configuration to a second configuration based on a difference between the first status information and the second status information,
   wherein the first status information is different from the second status information and the menus in the first configuration are different from the menus in the second configuration.

13. The mobile terminal of claim 12, wherein the status information includes at least one of information regarding a time of the mobile terminal, information regarding a location of the mobile terminal, and information detected through at least one of sensors provided in the mobile terminal, and
   wherein the usage information includes information regarding at least one of the number of executions of one or more of the menus displayed on the screen and an execution duration of the one or more of the menus displayed on the screen.

14. The mobile terminal of claim 12, further comprising:
   a user input unit configured to receive a command for editing the formed menu usage pattern,
   wherein the controller is further configured to edit the formed menu usage pattern based on the command, and
   wherein a configuration of the menus for the screen in the idle mode is changed based on the edited menu usage pattern.

15. The mobile terminal of claim 12, further comprising:
   a user input unit configured to receive an input for deleting at least one specific menu among the menus displayed on the screen in the idle mode,
   wherein the controller is further configured to delete the specific menu from the screen in the idle mode according to the input.

16. The mobile terminal of claim 12, wherein the controller is configured to:
   determine, by the mobile terminal, a remaining battery capacity of the mobile terminal, and
   change the menus to a third configuration based on the determined remaining battery capacity.

17. The mobile terminal of claim 12, wherein the menus include selectable items for execution of one or more applications.

18. The mobile terminal of claim 12, wherein the usage information includes information regarding whether to delete one or more of the menus displayed or to be displayed on the screen.

19. The mobile terminal of claim 12, wherein the screen in the idle mode includes a first area for displaying an item in relation to an execution of a widget among the menus displayed on the screen, and a second area for displaying an item in relation to an execution of an application among the menus displayed on the idle screen.

20. The mobile terminal of claim 12, wherein the menus in the first configuration are different from the menus in the second configuration with respect to at least one of a position, a size, and an order of the menus displayed on the screen.

21. The mobile terminal of claim 12, further comprising:
   at least one sensor including at least one of an acceleration sensor, a gyro sensor, a geomagnetic sensor, a proximity sensor, an illumination sensor, a temperature sensor, or a humidity sensor,
   wherein the status information is collected from information obtained through the at least one sensor provided in the mobile terminal.

* * * * *